H. HERLT.

Curtain-Fixture.

No. 9,184. Reissued May 4, 1880.

Witnesses:

E. E. Masson

W. B. Masson

Inventor,

Hermann Herlt.

T. C. Woodward Atty.

UNITED STATES PATENT OFFICE.

HERMANN HERLT, OF NEW YORK, N. Y.

CURTAIN-FIXTURE.

SPECIFICATION forming part of Reissued Letters Patent No. 9,184, dated May 4, 1880.

Original No. 203,270, dated May 7, 1878. Application for reissue filed March 6, 1880.

*To all whom it may concern:*

Be it known that I, HERMANN HERLT, a resident of the city, county, and State of New York, have invented a new, useful, and important Improvement in Curtain-Fixtures, as described in this specification.

Before my invention bars on which to suspend and slide curtains by means of sliding rings and cords had been made wholly of metal, either solid or hollow, and thick enough for the purpose, and the curtains were drawn open or closed by cords fastened to the slides above and below the bars. In such cases the bars were too heavy and too expensive when made of metal that will polish, and the cords and connecting devices were exposed and unsightly The object of my invention is to overcome these objections and afford to the trade curtain-fixtures of the kind that are light, strong, polished, easily operated, and that conceal the cord and connecting devices.

My invention consists, principally, in a bar made of cheap, light material, as wood, and covered with sheet or other thin metal, and having a longitudinal groove to receive and conceal the cord and connecting devices for drawing a curtain.

By my invention, as I prefer to make it, curtains are suspended and drawn open or closed by pulling one or the other end of the cord that drops from one end of the bar. The curtains are easily attached and detached, and are so suspended that they do not sag. The cord, connecting devices, and pulleys are out of view. The bar is highly polished, light, strong, and comparatively cheap, and the fixture is ornamental and attractive.

Figure 1:
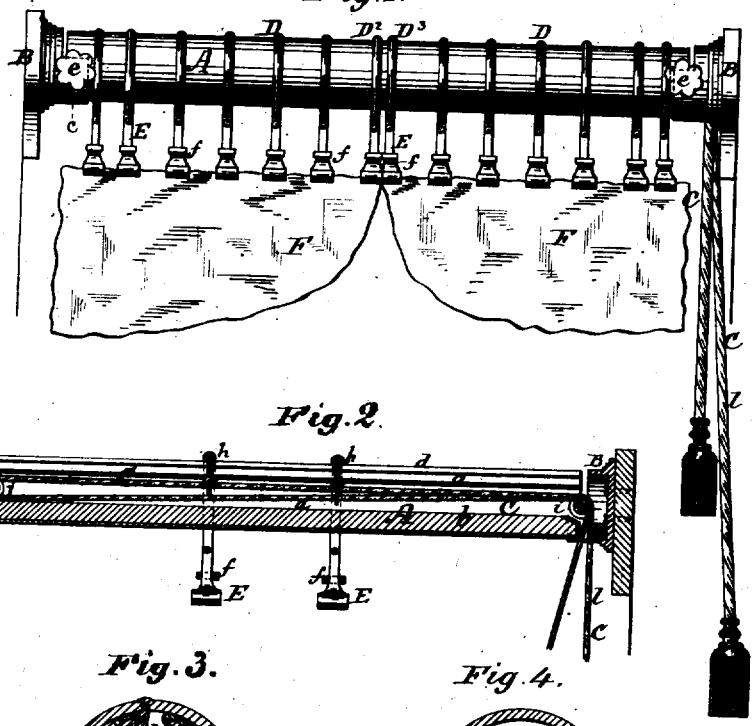
Figure 2:
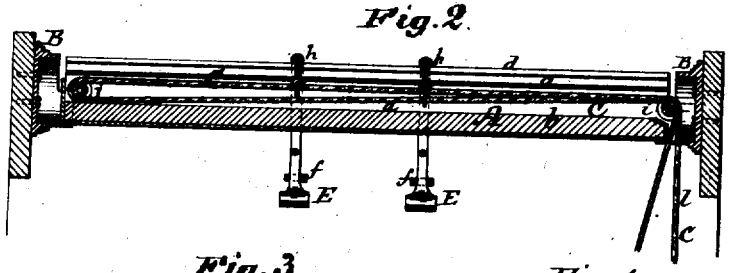
Figure 3:
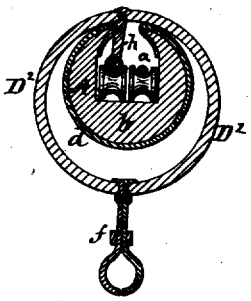
Figure 4:
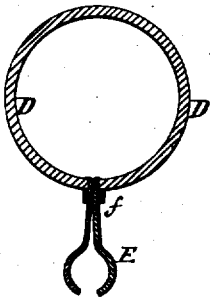
Figure 5:
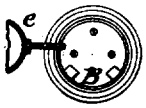

Figure 1 is a front view of one form of my invention, showing the bar supported in brackets, the curtain supported by clamps on the slides and carriers, and the ends of the depending cord tipped with hand-tassels. Fig. 2 is a longitudinal section of the same with the curtains, carriers, and tassels removed. Fig. 3 is an enlarged cross-section of the same through one of the slides, showing the cord and connecting devices. Fig. 4 is an edge view of one of the carriers. Fig. 5 is a cross-section of one of the sockets, showing the set-screw to hold the bar in position.

In the form of curtain-fixture shown A is a bar, having a groove, *a*, for a cord, C. The bar consists of a wooden core, *b*, covered with thin metal, *d*. B B are brackets, having sockets to support the ends of the bar, which are held from turning by set-screws *e*. The brackets are held in position by screws.

$D^2$ $D^3$ are slides, having projections *h*, to which the cord is attached in the groove in the bar, and having projections or clamps E, to which the curtains F are attached below the bar. D D are carriers, to which the curtains only are attached, having projections or clamps for that purpose. The clamp shown has a compression-slide, *f*. The cord passes through one of the sockets and into the groove in the bar and over roller or pulley *i* in the groove. It then passes through the bar and over another pulley, *j*, at the other end of the bar, and back through the bar and over pulley *i* again, both ends of the cord being left pendent, to which tassels are attached.

The upper portion, *l*, of the cord is attached to projection *h* on slide $D^2$, and the lower portion, *m*, to projection *h* on the slide $D^3$. By pulling the upper portion, *l*, of the cord the slides, and consequently the curtains, will be drawn together, and by pulling the lower portion, *m*, of the cord, the slides, and consequently the curtain, will be drawn apart.

Slight changes may be made in the construction and operation of the fixture within the scope of my invention. For example, one slide and a single curtain may be used. The sockets may be dispensed with, the curtains may be fastened without the clamps, and supports may be used instead of the pulleys.

I claim as my invention—

1. The combination of curtain-bar A, having core *b* and groove *a*, adapted to receive a cord and connecting mechanism, and covered with thin metal, *d*, that will polish, slides $D^2$ $D^3$, adapted to be attached to the cord in the groove and to curtains below the bar, rollers *i j*, located to support the cord in the groove, and carriers D, adapted to be attached to the curtains below the bar, substantially as described.

2. A curtain-bar, of wood or other material, having a longitudinal groove to receive a cord and connecting devices, and covered with thin metal that will polish, leaving the groove exposed, in combination with a slide having means for attachment to a cord in the groove and to a curtain below the bar, a roller in the groove to support a cord, a cord in the groove attached to the slide and pendent from one end of the bar, and carriers on the bar to hold the curtain from sagging.

3. A curtain-bar, of wood or other material, having a longitudinal groove to receive a cord and connecting devices, and covered with thin metal that will polish, leaving the groove exposed, in combination with a slide having means for attachment to a cord in the groove and to a curtain below the bar, a roller in the groove to support a cord, and a cord in the groove attached to the slide and pendent from one end of the bar.

4. A curtain-bar, of wood or other material, having a longitudinal groove to receive a cord and connecting devices, and covered with thin metal that will polish, leaving the groove exposed, in combination with a slide having means for attachment to a cord in the groove and to a curtain below the bar, and a roller in the groove to support the cord.

5. The combination of a curtain-bar covered with thin metal that will polish, and having an exposed groove adapted to receive an operating-cord and connecting mechanism, slides adapted to be attached to the cord in the groove and to curtains below the bar, supports located to sustain the cord in the groove, carriers adapted to be attached to the curtains below the bar, and a cord in the groove attached to the slides and pendent from one end of the bar, substantially as described.

6. The combination of a curtain-bar covered with thin metal that will polish, and having an exposed longitudinal groove adapted to receive an operating-cord and connecting mechanism, a slide adapted to be attached to the cord in a groove and to a curtain below the bar, a support located to sustain the cord in the groove so that the cord can be operated from one end of the bar, and a carrier supported on the bar and adapted to be attached to the curtain below the bar.

7. The combination of a curtain-bar covered with thin metal that will polish, leaving the groove exposed, and having a groove adapted to receive an operating-cord and connecting mechanism, slides adapted to be attached to the cord in the groove and to curtains below the bar, rollers located to support the cord in the groove, and carriers adapted to be attached to the curtains below the bar, substantially as described.

8. A curtain-bar, of wood or other material, having a longitudinal groove to receive a cord and connecting mechanism, and covered with thin metal that will polish, leaving the groove exposed.

In testimony whereof I hereunto subscribe my signature and affix my seal, in the presence of two attesting witnesses, on the 13th day of December, 1879.

HERMANN HERLT. [L. S.]

Witnesses:
JOHN JOSEPH WULLING,
LOUIS P. DEXHEIMER.